(12) United States Patent
Lehnert et al.

(10) Patent No.: US 6,266,256 B1
(45) Date of Patent: Jul. 24, 2001

(54) CIRCUIT FOR CORRECTING THE POWER FACTOR

(75) Inventors: Klaus Lehnert, Freital; Henry Gueldner, Heidenau; Franz Raiser, Munich, all of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/701,301

(22) PCT Filed: Feb. 18, 2000

(86) PCT No.: PCT/DE00/00461
§ 371 Date: Nov. 28, 2000
§ 102(e) Date: Nov. 28, 2000

(87) PCT Pub. No.: WO00/64037
PCT Pub. Date: Oct. 26, 2000

(30) Foreign Application Priority Data

Mar. 30, 1999 (DE) .............................................. 199 14 505

(51) Int. Cl.[7] .................................................. H02M 5/458
(52) U.S. Cl. ............................................. 363/37; 363/132
(58) Field of Search .................................. 363/34, 37, 39, 363/40, 123, 131, 98, 132

(56) References Cited

U.S. PATENT DOCUMENTS

| | | | | |
|---|---|---|---|---|
| 5,408,403 | * | 4/1995 | Nerone et al. | 363/37 |
| 5,561,595 | * | 10/1996 | Smith | 363/37 |
| 5,598,326 | * | 1/1997 | Liu et al. | 363/34 |
| 5,631,814 | * | 5/1997 | Zak | 363/37 |
| 5,959,849 | * | 9/1999 | Batarseh | 363/16 |
| 6,115,276 | * | 9/2000 | Mao | 363/127 |
| 6,198,642 | * | 3/2001 | Kociecki | 363/37 |

OTHER PUBLICATIONS

Wei Chen, et al., "An Improved 'Charge Pump' Electronic Ballast with Low THD and Low Crest Factor", 1996, pp. 622–627, Annual Applied Power Electronics Conference and Exposition (APEC), US, New York, IEEE, vol. CONF. 11, XP000585906.

T.F. Wu, et al., "Analysis and Design of a High Power Factor, Single–Stage Electronic Ballast with Dimming Feature", 1997, pp.1030–1036, APEC. Annual Applied Power Electronics Conference and Exposition, US, New York, IEEE, vol. CONF. 12, XP000731062.

G. Chae, et al., "High Power Factor Correction Circuit For Low–Cost Electronic Ballasts", May 1997, pp. 922–922, Electronics Letters, GB, IEE Stevenage, vol. 33, No. 11, XP000727008.

Wei Chen et al. "An Improved 'Charge Pump' Electronic Ballast with Low THD and Low Crest Factor", Sep. 1997, pp. 867–875, IEEE Transactions on Power Electronics, vol. 12, No. 5.

* cited by examiner

*Primary Examiner*—Adolf Deneke Berhane
(74) *Attorney, Agent, or Firm*—Carlo S. Bessone

(57) ABSTRACT

The invention relates to a circuit for power-factor correction having a rectifier (14) which can be connected on the input side to an AC voltage source (10) and which is connected on the output side to at least one series circuit comprising a capacitor (CS1) and a diode (DS1), with the diode (DS1) being arranged such that the capacitor (CS1; CS2) cannot be charged through the diode (DS1; DS2) by the output signal from the rectifier (14), a first and a second electronic switch (T1, T2) connected in series as part of a half bridge or full bridge, each having a freewheeling diode (DF1; DF2) connected in parallel with the switch (T1; T2) and, with the [lacuna] formed by the junction point between the first and second switches (T1, T2) [lacuna] an output connection of the half bridge or full bridge is on the one hand connected via an inductance (L) to a point on the connection of the capacitor (CS1) and diode (DS1) of each series circuit comprising a capacitor (CS1) and a diode (DS1), and on the other hand forms a connection for a load (LD), and the signal at this connection during operation is at a considerably higher frequency than the output signal from the AC voltage source (10), an energy-storage capacitor (CS) which is connected in parallel with the two switches (T1, T2) and at least one further diode (DP1; DP2) which is arranged between the energy-storage capacitor (CS) and the rectifier (14) in such a manner that the energy-storage capacitor (CS) cannot be discharged through the rectifier (14).

9 Claims, 4 Drawing Sheets

CIRCUIT FOR CORRECTING THE POWER FACTOR

The present invention relates to a circuit for power-factor correction. Such circuits are also known by the terms "charge pumps" or "pump circuits". They are used, for example, to satisfy Standard IEC 1000-3-2, in which the electricity supply authorities have defined the acceptable network-current harmonic levels. Accordingly, it is undesirable to draw high-frequency energy from the electricity supply network. The network current which is drawn from the network is, optimally, proportional to the network voltage. Proportionality between the network current and the network voltage allows the maximum amount of power to be transmitted for any given cable size. Reactive currents, which would occur if the network voltage and network current were not proportional, would cause cable losses, additionally loading the cables and thus leading to interference with other loads.

Such circuits for power-factor correction are used, inter alia, for ballasts for the operation of gas-discharge lamps.

The present invention is based on a prior art as is disclosed in the article by W. Chen, F. Lee and T. Yamauchi entitled "An Improved "Charge Pump" Electronic Ballast with Low THD and Low Crest Factor" which appeared in IEEE Transactions on Power Electronics, Vol. 12, No. 5, September 1997 pages 867 to 875. With reference to FIG. 8 there, this article was based on the problem of modifying the circuit from that in FIG. 1 there in such a manner that the voltage at the point A, that is to say $V_a$ (see the illustration in FIG. 7 there) has a constant high-frequency amplitude. This would result in the power drawn from the network being proportional to the network voltage. The diodes $Da_1$ and $Da_2$ were introduced in order to ensure this, as a result of which the point A is clamped to the capacitor $C_B$. This precludes any reactions from the load and maintains a $V_a$ whose high-frequency amplitude is constant, see the illustration in FIG. 9 there.

A disadvantage of the circuit shown in FIG. 8 of this publication is that the lamp voltage is also limited by the diode $Da_2$. It is thus impossible to produce the necessary starting voltage unless a transformer is connected between the pump circuit and the lamp to be operated. The additional costs for a transformer are undesirable in mass-produced items such as ballasts for lamps.

The present invention is therefore based on the object of providing a circuit for power-factor correction, that is to say a pump circuit, which needs no transformer.

This object is achieved by a circuit having a rectifier which can be connected on the input side to an AC voltage source and which is connected on the output side to at least one series circuit comprising a capacitor and a diode, with the diode being arranged such that the capacitor cannot be charged through the diode by the output signal from the rectifier. It furthermore comprises a first and a second electronic switch connected in series as part of a half bridge or full bridge, each having a freewheeling diode connected in parallel with the switch and, with the [lacuna] formed by the junction point between the first and second switches [lacuna] an output connection of the half bridge or full bridge is on the one hand connected via an inductance to a point on the connection of the capacitor and diode of each series circuit comprising a capacitor and a diode, and on the other hand forms a connection for a load, with the signal at this connection during operation being at a considerably higher frequency than the output signal from the AC voltage source. It furthermore has an energy-storage capacitor which is connected in parallel with the two switches, as well as at least one further diode which is arranged between the energy-storage capacitor and the rectifier in such a manner that the energy-storage capacitor cannot be discharged through the rectifier.

The invention on the one hand offers the advantage of additional freedom for the design of the elements in the pump and load circuits, by very largely overcoming any reaction between the two circuits. This furthermore makes it simple to adjust the lamp power by appropriate design of the capacitor CS1 or of the capacitor CS1, CS2, in such a manner that the voltage on the capacitor or the capacitors reaches the respective present value of the supplying, rectifier AC voltage at least once, in which case it can be assumed that the rectifier AC voltage is constant when a load cycle is considered. Furthermore, the energy which is intended to be pumped into the load depends only on the capacitance of the capacitor CS1, or the capacitances of the capacitors CS1 and CS2. The inductance of the inductor L must and can be small, so that it need only be large enough to ensure that the electrical switches are not subjected to excessive currents and that they remain switched on when the voltage is 0 (ZVS).

In an advantageous development, a filter is arranged between the inputs of the rectifier and, when the circuit is connected to an AC voltage source, is arranged in series or parallel with the AC voltage source. Additionally or as an alternative to this, a filter may be arranged in series or parallel with the output of the rectifier.

In a first embodiment, the circuit comprises a series circuit formed by a diode and a capacitor, as well as a further diode. In a further embodiment, which allows pumping when either of the two switches is in the on state, that is to say balancing of the previously mentioned embodiment, the circuit comprises two series circuits formed by a diode and capacitor as well as two further diodes.

As already mentioned, the circuit can be operated in the form of a half bridge or a full bridge. In a full bridge, the circuit comprises two further switches with the junction point between the two further switches forming the second load connection. In the case of a half bridge, the circuit comprises two coupling capacitors, with the junction point between the two coupling capacitors forming the load connection, and with the series circuit formed by the two coupling capacitors being arranged in parallel with the energy-storage capacitor. As an alternative to this, it may also comprise only one coupling capacitor, one of whose connections forms the second load connection, with its second connection being connected to one of the two connections of the energy-storage capacitor.

Further advantageous developments of the invention are defined in the dependent claims.

Exemplary embodiments of the invention will be described in more detail in the following text with reference to the attached drawings, in which:

FIG. 1b shows an alternative embodiment to the embodiment illustrated in FIG. 1a;

Figure 1A:
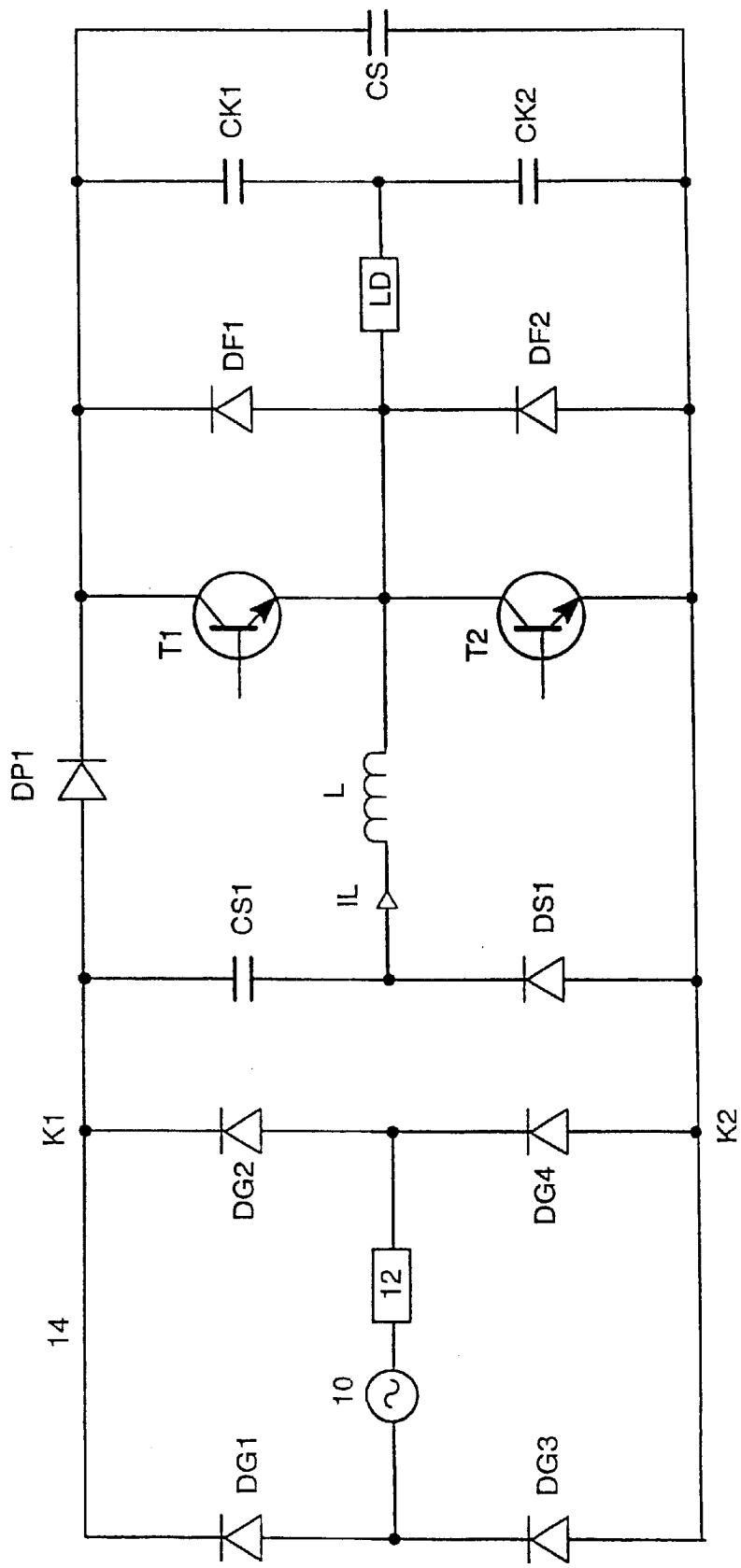
FIG. 1a shows a first embodiment of the circuit according to the invention, having a half bridge and two coupling capacitors.

FIG. 1a shows a circuit having an AC voltage source 10 which is arranged in series with a filter 12. The network voltage may be used as the AC voltage source 10. The filter 12 is used on the one hand to prevent high-frequency power being drawn from the AC voltage source, and on the other hand to prevent high-frequency signals from being fed into the AC voltage source. This is a low-pass filter which may, for example, be in the form of an inductor.

The AC voltage source 10 and filter 12 are connected to the inputs of a rectifier 14, which comprises the four diodes DG1, DG2, DG3 and DG4. As an alternative to the circuitry shown, the filter 12 may also be arranged in parallel with the input connections of the rectifier, which may then, at low cost, be in the form of a capacitor. The series circuit comprising a capacitor CS1 and a diode DS1 is connected in parallel with the output terminals K1, K2 of the rectifier. The capacitor CS1 is connected via a diode DP1 to the series circuit comprising two electrical switches T1 and T2, each of which has a freewheeling diode, DF1 and DF2 respectively, connected in parallel with it. The junction point between the two switches T1 and T2 is on the one hand connected via an inductance point L to the junction point between the capacitor CS1 and the diode DS1, and on the other hand represents a connection for the load LD.

Since, in the embodiment shown in FIG. 1a, the load LD is connected to the output terminals of a half bridge, the second load connection is formed by the junction point between two coupling capacitors CK1, CK2, which are arranged in parallel with the switches T1 and T2. In the circuit shown in FIG. 1a, an energy-storage capacitor CS is arranged in parallel with the coupling capacitors CK1 and CK2.

If the electronic switches T1 and T2, respectively, are formed by field-effect transistors, it should be remembered that the freewheeling diodes DF1 and DF2 are already included in the field-effect transistors.

The circuit shown in FIG. 1a operates as follows: the operating frequency of the two electrical switches, which are operated in antiphase, is high in comparison with the frequency of the AC voltage source. For example, it may be 50 kHz in comparison with 50 Hz, that is to say the two transistors are each switched on alternately for 10 µs. During the time in which the switch T2 is switched on, current flows from the rectifier 14, via the terminal K1 through the capacitor CS1, and via the inductance L and the electrical switch T2 to the terminal K2 of the rectifier. The capacitor CS1 and the inductance L are in this case of such sizes that the capacitor CS1 is actually charged to the present voltage of the AC voltage source 10 before the switch T2 is switched off.

As soon as CS1 has been charged to the present voltage of the AC voltage source, the potential is the same on both sides of the diode DS1, which leads to the diode DS1 being forward-biased. Even if CS1 has already reached its final charge state, the inductance L continues to carry the current, which now flows in the circuit comprises the diode DS1, inductance L and switch T2. The energy that is stored in the inductance L during this cycle is proportional to the present voltage of the AC voltage source. The energy is thus stored in this circuit for the rest of the time for which the switch T2 is switched on. If, for instance as in the above example, the total time for which T2 is switched on is 10 µs, the final charge state of CS1 is reached after only 8 µs and 2 µs thus remain during which the energy is stored in this cycle. Once the switch T2 has been switched off, that is to say the switch is now in the off state, the energy stored during the cycle mentioned above flows via the freewheeling diode DF1 into the energy-storage capacitor CS, where it is discharged. The pump diode DP1 prevents energy from flowing back from the energy-storage capacitor CS to the output terminal K1 of the rectifier.

Thus, in the described circuit, the energy drawn from a network is always proportional to the network voltage, thus satisfying the requirement mentioned initially for the network current and network voltage to be proportional. On the other hand, this circuit allows the operation of the load LD, in particular starting, in the situation where the load is a gas-discharge lamp, without any transformer being connected in between.

Figure 1B:
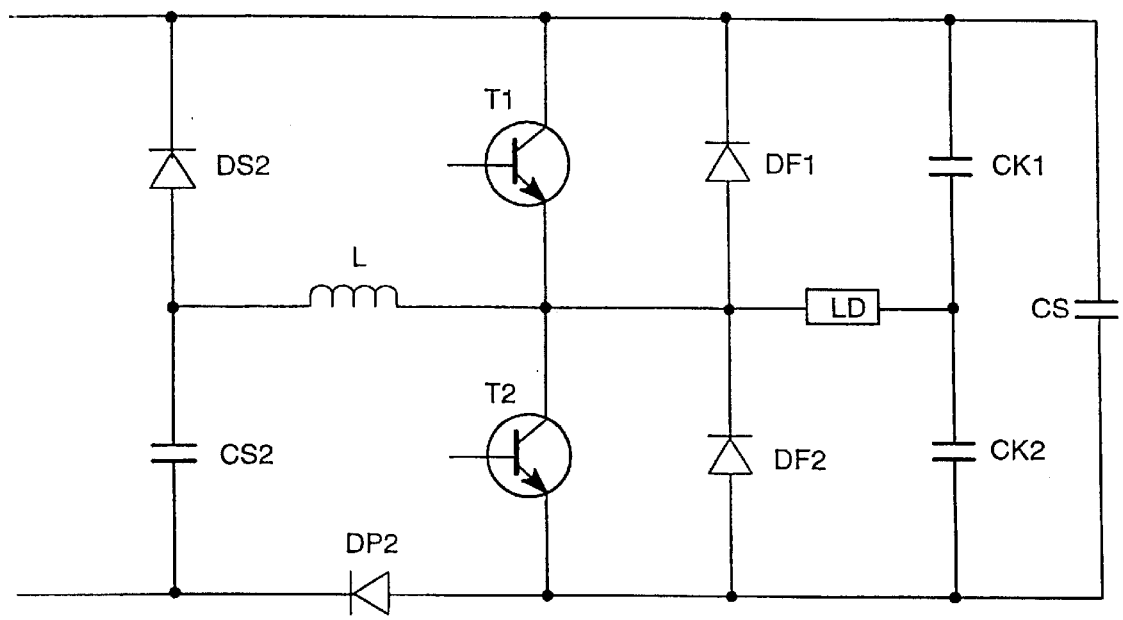

The variant illustrated in FIG. 1b is modified from the embodiment illustrated in FIG. 1a in that a capacitor CS2 is now charged during the time in which the switch T1 is switched on. In a corresponding way, a diode DS2 must be provided, connected in series with the capacitor CS2, although the positions of these two components with respect to the output terminals of the rectifier 14 are now interchanged. In a corresponding manner, a diode DP2 is connected between the capacitor CS2 and the switch T2, in order to prevent the energy-storage capacitor CS from discharging.

Figure 1C:
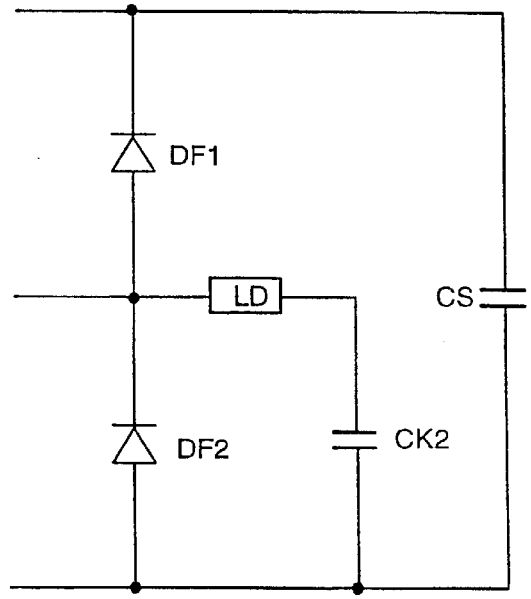
FIG. 1c shows an alternative to the load connection shown in FIG. 1a, using a half bridge with a coupling capacitor.

FIG. 1c shows an embodiment using only one coupling capacitor CK2. As an alternative to this, in its circuitry shown in FIG. 1a or 1b, the coupling capacitor CK1 could carry out the same function instead of CK2, that is to say correcting for the direct-current component. The coupling capacitors may preferably be in the form of foil capacitors, with the energy-storage capacitors preferably being in the form of electrolytic capacitors.

Figure 1D:
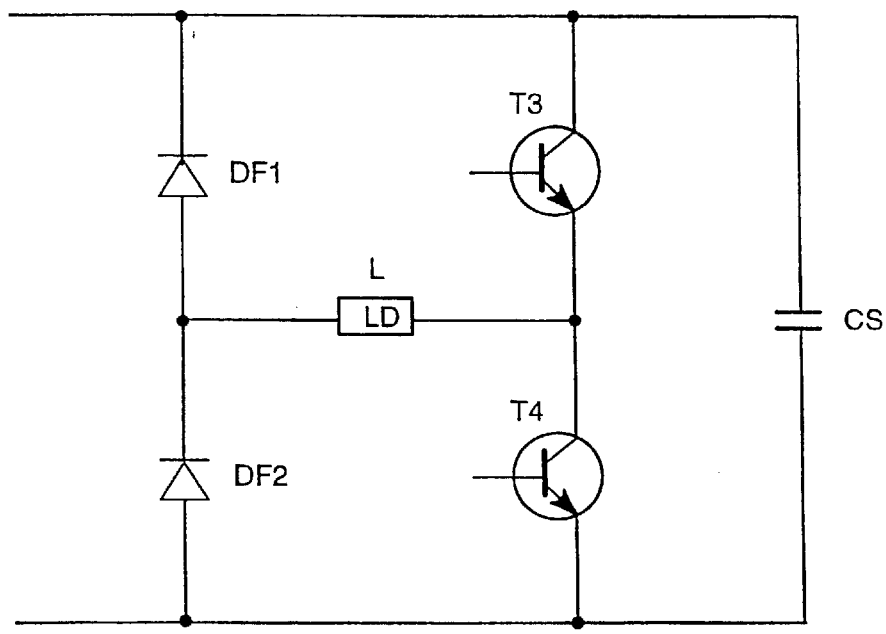
FIG. 1d shows an alternative to the load connection according to the embodiments in FIGS. 1a and 1c, with a full bridge.

While, in the embodiments shown in FIGS. 1a to 1c, the load LD is connected to the output terminals of half bridges, FIG. 1d shows a version of the idea according to the invention in a circuit having a full bridge. This also includes the electrical switches T3 and T4.

Figure 2:
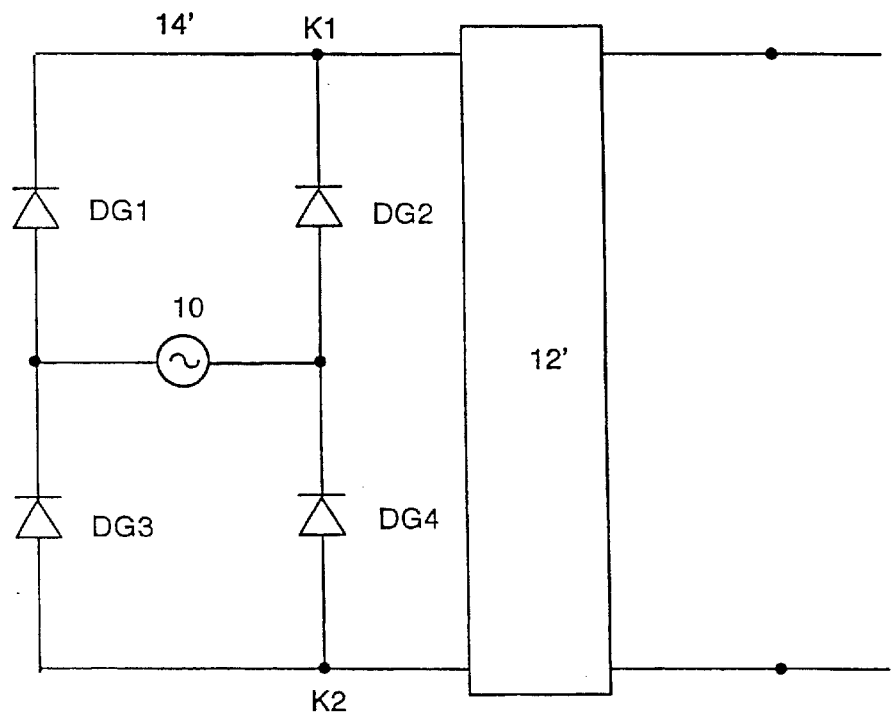
FIG. 2 shows an alternative to the embodiments shown in FIGS. 1a, 1b, 1c, with a filter arranged in parallel with the rectifier.

As alternative circuitry to that shown in FIG. 1a, FIG. 2 shows a low-pass filter 12' connected to the output terminals K1 and K2 of the rectifier 14'. While the filter 12' is arranged in parallel in the illustrative embodiment, it may also be connected in series with the output terminals K1 and K2. In one particularly simple version, the filter 12' may be in the form of a capacitor when arranged in parallel with the output terminals K1 and K2, and in the form of an inductor when arranged in series.

Figure 3:
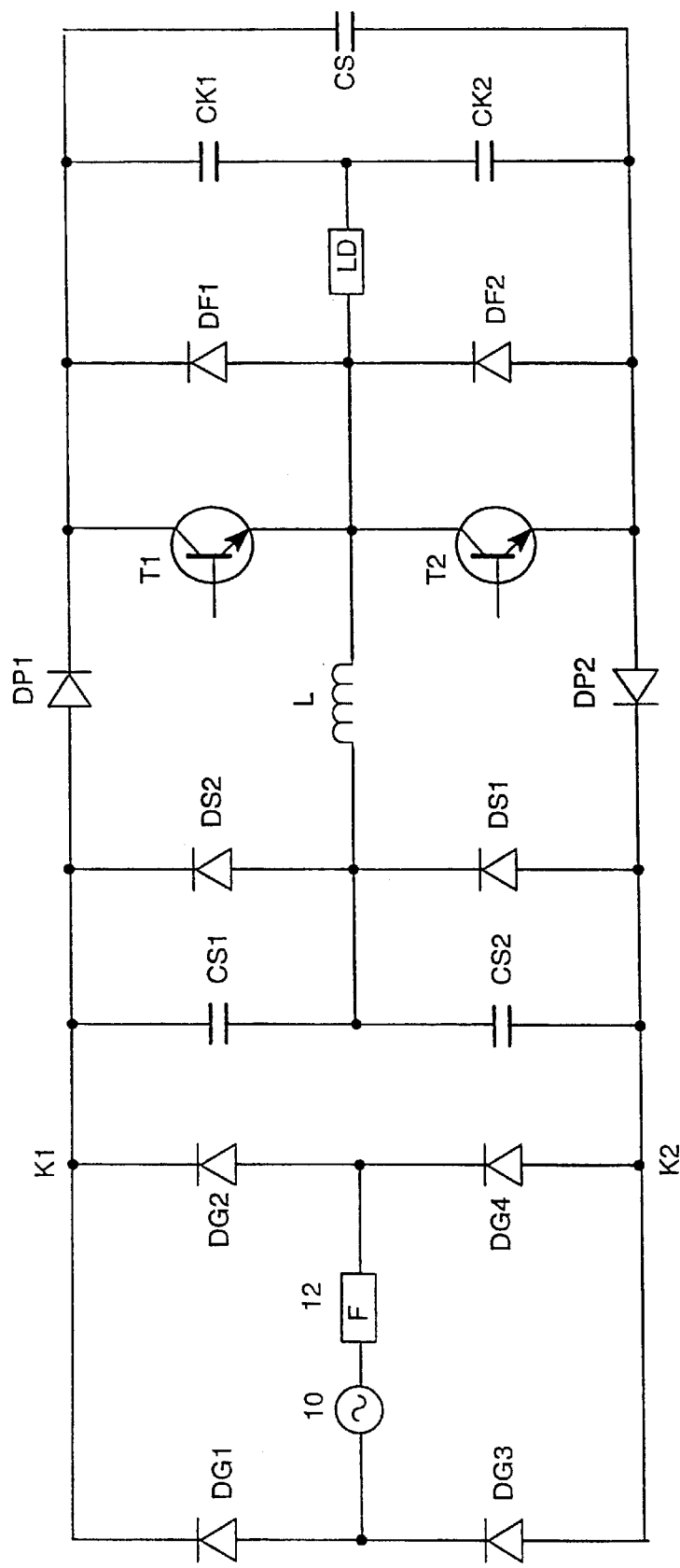
FIG. 3 shows a further embodiment, which has been made symmetrical with respect to the embodiments shown in FIGS. 1 and 2.

FIG. 3 shows a particularly preferred embodiment, in which both the circuitry implementation and the method of operation of the solutions shown in the embodiments in FIG. 1a and FIG. 1b are combined, that is to say energy is drawn from the AC voltage source 10 both during the time T2 is switched on and when T1 is switched on. For a person skilled in the art, it is obvious that the circuit shown in FIG. 3 can also be produced together with the variants shown in FIG. 1c, FIG. 1d and FIG. 2.

What is claimed is:

1. A circuit for power-factor correction having
    a rectifier (14; 14') which can be connected on the input side to an AC voltage source (10) and which is connected on the output side to at least one series circuit comprising a capacitor (CS1; CS2) and a diode (DS1; DS2), with the diode (DS1; DS2) being arranged such that the capacitor (CS1; CS2) cannot be charged through the diode (DS1; DS2) by the output signal from the rectifier (14; 14'), a first and a second electronic switch (T1, T2) connected in series as part of a half bridge or full bridge, each having a freewheeling diode (DF1; DF2) connected in parallel with the switch (T1; T2) and, with the [lacuna] formed by the junction point between the first and second switches (T1, T2) [lacuna] an output connection of the half bridge or full bridge is on the one hand connected via an inductance (L) to a point on the connection of the capacitor (CS1; CS2) and diode (DS1; DS2) of each series circuit comprising a capacitor (CS1; CS2) and a diode (DS1; DS2), and on the other hand forms a connection for a load (LD), and the signal at this connection during operation is at a considerably higher frequency than the output signal from the AC voltage source (10), an energy-storage capacitor (CS) which is connected in parallel with the two switches (T1, T2) and at least one further diode (DP1; DP2) which is arranged between the energy-storage capacitor (CS) and the rectifier (14; 14') in such a manner that the energy-storage capacitor (CS) cannot be discharged through the rectifier (14; 14').

2. The circuit as claimed in claim 1, wherein a filter (12) is arranged between the inputs of the rectifier (14; 14') and, when the circuit is connected to an AC voltage source (10), is arranged in series or parallel with the AC voltage source (10).

3. The circuit as claimed in claim 1, wherein a filter (12') is arranged in series or parallel with the output of the rectifier (14; 14').

4. The circuit as claimed in claim 1, wherein the circuit has a series circuit comprising a diode (DS1; DS2), a capacitor (CS1; CS2) and a further diode (DP1; DP2).

5. The circuit as claimed in claim 1, wherein the circuit has two series circuits comprising a diode (DS1, DS2), a capacitor (CS1, CS2) and two further diodes (DP1, DP2).

6. The circuit as claimed in claim 1, wherein the full bridge comprises two further switches (T3, T4) with the junction point between the two further switches (T3, T4) forming the second load connection.

7. The circuit as claimed in claim 1, wherein the half bridge comprises two coupling capacitors (CK1, CK2), with the junction point between the two coupling capacitors (CK1, CK2) forming the second load connection, and with the series circuit comprising the two coupling capacitors (CK1, CK2) being arranged in parallel with the energy-storage capacitor (CS).

8. The circuit as claimed in claim 1, wherein the energy-storage capacitor is formed by two coupling capacitors (CK1, CK2) which are part of the half bridge, with the junction point between the two coupling capacitors (CK1, CK2) forming the second load connection.

9. The circuit as claimed in claim 1, wherein said circuit comprises only one coupling capacitor (CK1; CK2)., one of whose connections forms the second load connection, with its second connection being connected to one of the two connections of the energy-storage capacitor (CS).

* * * * *